United States Patent [19]

Hoppe

[11] 4,015,474
[45] Apr. 5, 1977

[54] STABILIZING MEANS FOR ROTOR OF BEARINGLESS FLOWMETER

[76] Inventor: David E. Hoppe, 294 Beacon St., Boston, Mass. 02116

[22] Filed: Oct. 10, 1975

[21] Appl. No.: 621,531

Related U.S. Application Data

[63] Continuation of Ser. No. 300,145, Oct. 24, 1972, abandoned.

[52] U.S. Cl. .................................................. 73/229
[51] Int. Cl.$^2$ ......................................... G01F 1/06
[58] Field of Search ............................. 73/229, 253

[56] References Cited

UNITED STATES PATENTS 2,215,447  9/1940  Kollsman ............................ 73/194
3,447,373  6/1969  McNabb .............................. 73/229
3,774,882  11/1973  O'Connor ........................... 73/229

Primary Examiner—Herbert Goldstein

[57] ABSTRACT

Improved dynamic balance of the ring-shaped rotor used in conjunction with a vortex chamber in the bearingless type of flowmeter is obtained by symmetrically spacing at least nine jets circumferentially around the vortex chamber. Additional stabilization is provided for the rotor by employing a plurality of exhaust ports for the vortex chamber radially displaced from the chamber center and disposed equidistant from the center and one another.

1 Claim, 5 Drawing Figures

U.S. Patent  April 5, 1977  4,015,474
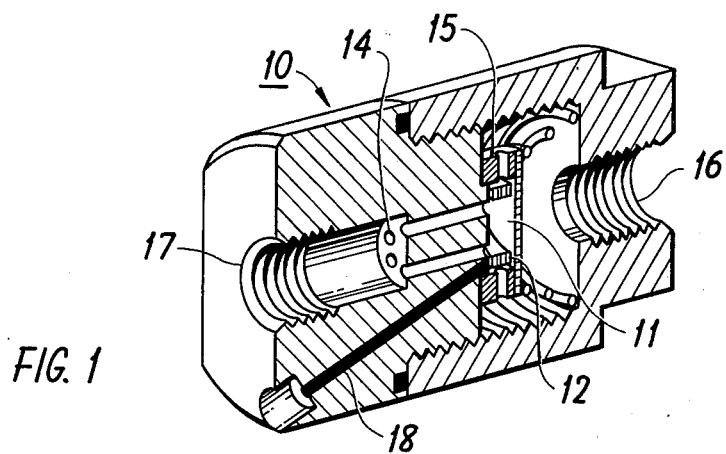
FIG. 1
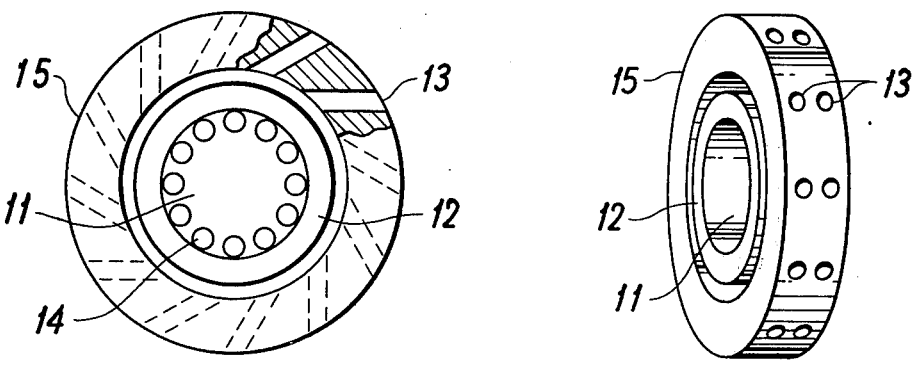
FIG. 2  FIG. 3
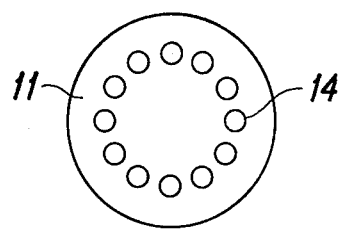  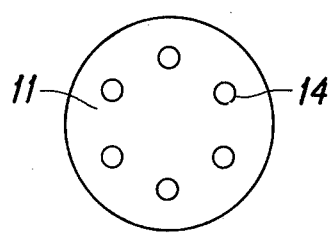
FIG. 4  FIG. 5

STABILIZING MEANS FOR ROTOR OF BEARINGLESS FLOWMETER

This case is a continuation of application Ser. No. 300,145 filed 10/24/72 now abandoned.

This invention relates to improvements and modifications to the bearingless type of flowmeter as originally disclosed in U.S. Pat. No. 3,447,373. The bearingless flowmeter employs a vortex chamber carrying within in fluid suspension a ring-shaped rotor. In operation, the rotor must spin without contacting the walls of the enclosing chamber, or flowmeter accuracy and reliability will be impaired.

The bearingless meter appears particularly attractive for the measurement of very low flow rates, in that the absence of bearings with the rotor permits unusual sensitivity to the most minute effects of fluid flow. However, a problem arose with much severity when the meter chamber size was selected for the exploitation of very low flow rates, for example, for an application in which the lowest rate to be measured was in the region of 1 gallon per hour. It was found that the rotor was generally unstable and tended to contact the chamber walls. The resulting performance was unacceptable and the successful provision of a bearingless flowmeter such as could be made to operate with flows below a gallon per hour had to attend the solution to the rotor instability problem. A variety of experiments and attempts to provide improved stability for the smaller bearingless flowmeters was performed over an extended period of time to no avail, and it appeared the smaller flow measurement applications were simply not practicable. Every reasonable avenue was explored. More careful machining and fabricating was tried, and ever closer tolerances specified, in the expectation that perfect balance and symmetry would be a solution. Different geometrical proportions and relationships were examined. The jet angles were experimented with, and the number of jets in the smaller meters was varied from the generally employed number of four down to two and up to eight. The size and length of the jets was varied. All these investigations proved to be fruitless. Those skilled in this art attempted every available approach to obtain the requisite dynamic balance, but achieved only negative results. The solution to the problem of rotor stability had thus been unobtainable and unobvious for a period of time measured in years to those most anxious to find a solution. It appeared to those skilled in the art that every conceivable revision to the basic concept had been tried and that the problem was insurmountable.

The present invention provides appropriate means to obtain rotor stability so that the rotor behaves entirely in a non-contacting manner relative to the chamber walls throughout the range of flowmeter operation, thus providing the requisite meter repeatability and reliability, without which no flowmeter can be considered a viable commercial item. The solution to this problem is eminently simple in retrospect, however elusive it may have been for the years prior to its discovery. By virtue of the invention, it is now known that in small flowmeters the number of jets circumferentially spaced and leading into the chamber must be at least nine, and preferably about 12 as a matter of convenience and performance. The number 12 is preferred because this number provides quite satisfactory stability, although it can be shown that the stability suffers no deterioration as the number is increased upwards above 12, and because 12 is a convenient number to machine, considering the availability and capabilities of indexing fixtures and dividing heads. The reason for this gray hydrodynamic region between eight jets and the number chosen for a practical low-flow measurement meter cannot be satisfactorily explained, and is only evident as a phenomena that was in the past unknown and unexpected, and still unaccounted for. It may be said that this phenomena appears localized, in terms of jet numbers, in that experimentation with various numbers of jets in the past from two to eight gave results which did not suggest the solution to lie in even higher jet numbers, but to the contrary, led those skilled in the art to believe that the number of jets was not material, and that a variation in the number of jets could provide no improvements in rotor stability.

FIG. 1 is a cut-away drawing of a typical flowmeter embodying the invention:

FIG. 2 is a drawing showing a jet barrel of the invention and a rotor;

FIG. 3 shows a jet barrel with two rows of circumferential jets;

FIG. 4 depicts twelve exhaust ports leading from a chamber; and

FIG. 5 depicts six exhaust ports leading from a chamber.

Referring to FIG. 1, a flowmeter 10 is shown in cross-section, with inlet 16, outlet 17, vortex chamber 11, rotor 12, jets shown cut-away in jet barrel 15, and optical read-out means 18. The description of the mode of operation disclosed in U.S. Pat. No. 3,447,343 is generally applicable here. FIG. 2 shows a jet barrel 15 having 12 tangential jets 13 leading into a chamber 11 in which is disposed a rotor 12. Also shown is a group of 12 exhaust ports 14, which conduct the metered fluid out of the chamber 11.

FIG. 3 shows a variation of the configuration a jets 13, in which two rows of 12 jets each are disposed adjacent one another. Alternatively, one row of 12 jets 13 may be shifted circumferentially slightly with respect to the other, so that the total of 24 jets appears circumferentially spaced, each to one another, and symmetrically disposed throughout the circumference of jet barrel 15.

FIGS. 4 and 5 show the provision of a plurality of exhaust ports 14 in connection with chamber 11. The exhaust ports are conveniently of a number between 6 and 12, arranged in a group symmetrically disposed with respect to the chamber center and equispaced from one another. The provision of exhaust ports tends to reduce the effects of the chamber fluid vortex and to provide increased stability of operation.

Flowmeters employing the invention exhibit excellent performance with low flows and wide rangeabilities with exceptional repeatability, though the rotor may be made to spin 500 or so revolutions per second.

What is claimed is:

1. An improved rotor-stabilized bearingless flowmeter comprising
   inlet means for receiving fluid entering said flowmeter,
   at least nine circumferentially spaced jet passages adapted to respond to said fluid from said inlet means,
   an operating chamber adapted to receive said fluid from said jet passages and each of said jet passages opening into said chamber through the circumferential periphery thereof at an angle with a chamber radius so that said fluid entering said chamber from said jet passage tends to rotate within said chamber while passing therethrough, a rotor within said chamber adapted to rotate therein in a substantially stable manner in cooperation with said fluid entering said chamber from said at least nine jet passages and rotating within said chamber and passing through said chamber, and outlet means adapted to exhaust said fluid exiting from said chamber inwardly from said circular periphery thereof whereby the action of said at least nine jet passages in cooperation with said rotor and said chamber in the operation of said flowmeter tends to provide substantially stable rotor operation.

* * * * *